(12) United States Patent
Li-Yang

(10) Patent No.: US 6,376,948 B1
(45) Date of Patent: Apr. 23, 2002

(54) MOTOR-SYNCHRONOUS EXCITING BRAKE

(75) Inventor: Chang Li-Yang, Taipei (TW)

(73) Assignee: Chin-Tsang Wang, Taichung Hsien (TW)

( * ) Notice: Subject to any disclaimer, the term of this patent is extended or adjusted under 35 U.S.C. 154(b) by 0 days.

(21) Appl. No.: 09/537,492

(22) Filed: Mar. 30, 2000

(51) Int. Cl.⁷ .......................... H02K 7/102; B60T 13/04
(52) U.S. Cl. ............................ 310/77; 310/92; 188/171
(58) Field of Search ...................... 310/77, 92; 188/171

(56) References Cited

U.S. PATENT DOCUMENTS 4,381,048 A * 4/1983 Haverkamp et al. .......... 310/77

* cited by examiner

Primary Examiner—Burton S. Mullins
(74) Attorney, Agent, or Firm—A & J

(57) ABSTRACT

A motor-synchronous exciting brake structure having a housing containing a stator and a rotor located at the center of the stator, the two ends of the housing being respectively mounted with an end cap, and the rotor shaft of the rotor being mounted with a brake structure which is used to brake the rotor, characterized in that the brake structure is provided with a floating element slidably located at the rotor shaft and the end face of the floating element, corresponding to the end cap, is provided with a plurality of brake blocks for braking purpose, and a triggering element is slidably mounted within the floating element, an elastic element is urged by the triggering element and the floating element, and further, the end face of the triggering element, corresponding to the rotor, is formed with two corresponding guiding slots, and one side of the guiding slot is provided with a sloping face, wherein the sloping face is inclined toward the end face, the other end of the floating element is a limiting plate to restrict the triggering element, the circumference of a center hole on the limiting plate is provided with two corresponding extension slots, and a triggering spring is located between the rotor and the limiting plate; the rotor shaft is provided with a limiting rod and a guiding rod, wherein the limiting rod is engaged at the inner edge of the limiting plate, and the guiding rod is correspondingly mounted at the guiding slot of the triggering element, thereby a stable brake with a short braking distance motor synchronous exciting brake structure is formed.

1 Claim, 6 Drawing Sheets

MOTOR-SYNCHRONOUS EXCITING BRAKE

BACKGROUND OF THE INVENTION a) Technical Field of the Invention

The present invention relates to a motor-synchronous exciting brake structure, and in particular, by employing magnetism of the rotor to provide braking function without incorporating additional magnetic coils.

b) Description of the Prior Art

FIG. 1 is a conventional motor structure, wherein the securing seat 20 of the brake structure 2 is mounted to the end portion of the motor 1 after it passes through the rotor shaft 10. The securing seat 20 is provided with a plurality of guiding rods 21 and each of the individual rods 21 is provided in sequence with an urging element 22, a spring 24 and an exciting coil 23. An engaging section 11 is formed on the rotor shaft 10, and a pair of braking shoes 25 are provided between the securing seat 20 and the urging element 22. The exciting coil 23 and the motor 1 are joined together to a current distributor 26, such that the exciting coil 23 and the motor 1 are supplied with current synchronously or cut off from current supply synchronously.

As shown in FIGS. 2A and B, when the switch is initiated, the current distributor 26 provides current to the motor 1 and the exciting coil 23 such that the rotor shaft 10 of the motor 1 acted by the stator rotates. At the same time, the exciting coil 23 produces magnetism and the urging element 22 biases to the exciting coil 23 as a result of the magnetism. This will release the brake shoes 25, and the rotor shaft 10 rotates smoothly.

On the other hand, if the current supply is cut off, the exciting coil 23 does not produce magnetism to attract the urging element 22. As a result of the spring 24, the urging element 22 rapidly presses the brake shoes 25 from stop moving at the securing seat 20. As the rotor shaft 10 has lost its moving force, the rotor shaft 10 is immediately stopped, and the objective of braking is obtained.

The above conventional motor brake structure can provide a braking function but there are numerous drawbacks as follows:

1) Unstable braking force:
   As the urging element 22 is achieved by the four springs 24 of the four guiding rods 21, the uneven action of the springs 24 may cause the urging element 22 to contact with the brake shoes 25 at one side. Thus, the braking force is not stable, and the brake shoes 25 may easily worn out, which affects the longevity of the brake shoes 25.
2) Erroneous Action:
   The brake structure 2 and the motor 1 are respectively provided with a different exciting coil 23, and a current distributor 26 is employed to achieve the cut off current supply or to supply current, this will cause error action to the electronic components. The frequent ON-OFF current supply will damage the motor 1.
3) Braking time is longer:
   The urging element 22 is secured by the spring 24. If the brake shoes 25 are worn out, the braking time taken for braking function is longer.

SUMMARY OF THE INVENTION

Accordingly, it is an object of the present invention to provide a motor-synchronous exciting brake structure, so that erroneous action of the brake structure is mitigated and the longevity of the brake structure is increased.

Yet another object of the present invention is to provide a motor-synchronous exciting brake structure, wherein the stability of braking is improved and good braking effect can be obtained Another flier object of the present invention is to provide a motor-synchronous exciting brake structure, wherein the braking time is shortened and safety is greatly increased.

One aspect of the present invention is to provide a motor-synchronous exciting brake structure having a housing containing a stator and a rotor located at the center of the stator, the two ends of the housing being respectively mounted with an end cap, and the rotor shaft of the rotor being mounted with a brake structure which is used to brake the rotor, characterized in that the brake structure is provided with a floating element slidably located at the rotor shaft, and the end face of the floating element, corresponding to the end cap, is provided with a plurality of brake blocks for braking purpose, and a triggering element is slidably mounted within the floating element, an elastic element is urged by the triggering element and the floating element, and further, the end face of the triggering element, corresponding to the rotor, is formed with two corresponding guiding slots, and one side of the guiding slot is provided with a sloping face, wherein the sloping face is inclined toward the end face, the other end of the floating element is a limiting plate to restrict the triggering element, the circumference of a center hole on the limiting plate is provided with two corresponding extension slots, and a triggering spring is located between the rotor and the limiting plate; the rotor shaft is provided with a limiting rod and a guiding rod, wherein the limiting rod is engaged at the inner edge of the limiting plate, and the guiding rod is correspondingly mounted at the guiding slot of the triggering element, thereby a stable brake with a short braking distance motor synchronous exciting brake structure is formed.

Other objection and advantages of the invention will be apparent from and elucidated with reference to the embodiment described hereinafter.

DETAILED DESCRIPTION OF THE PREFERRED EMBODIMENT

Figure 1:
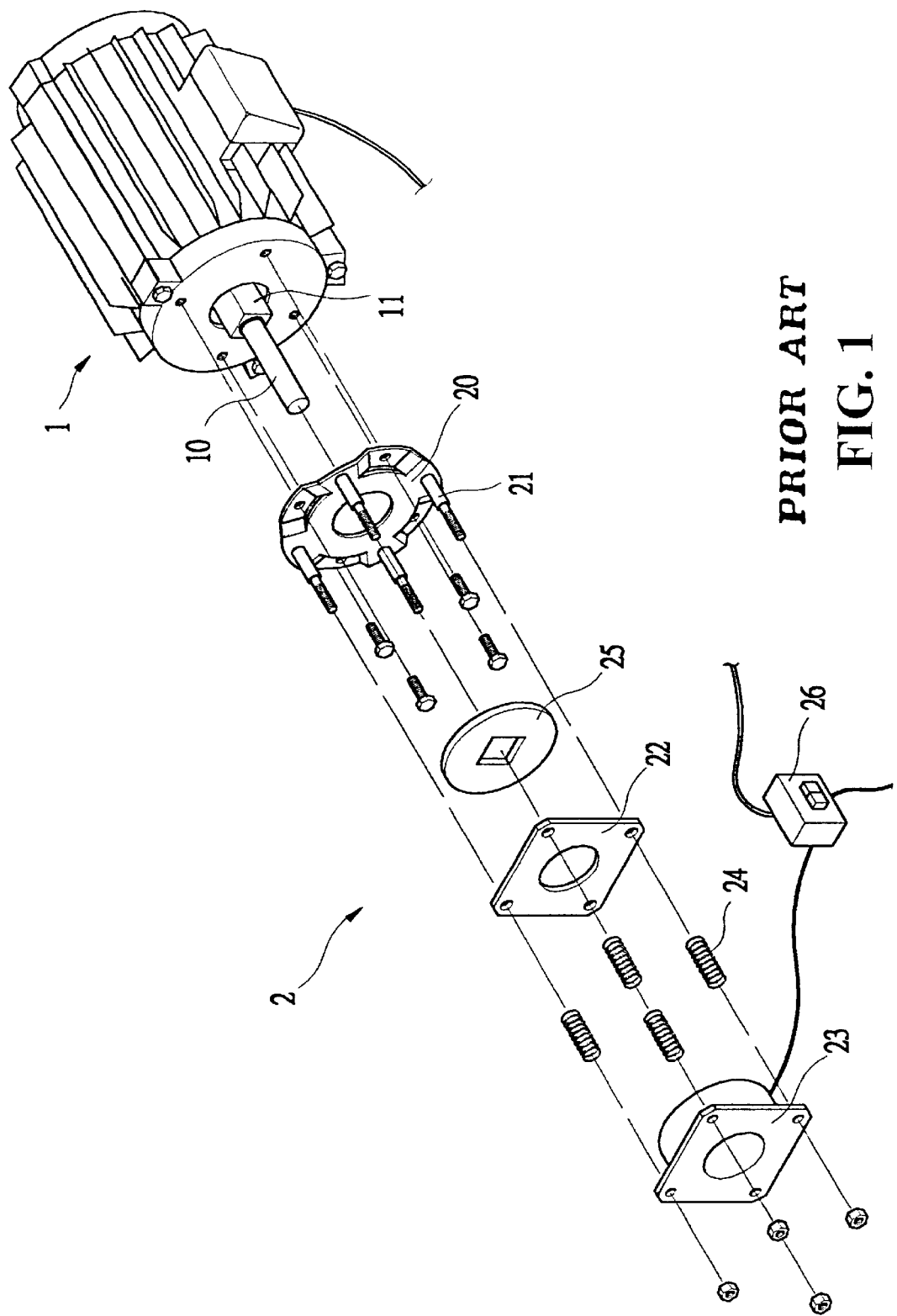
FIG. 1 is perspective exploded view of the conventional motor brake structure.
Figure 2A:
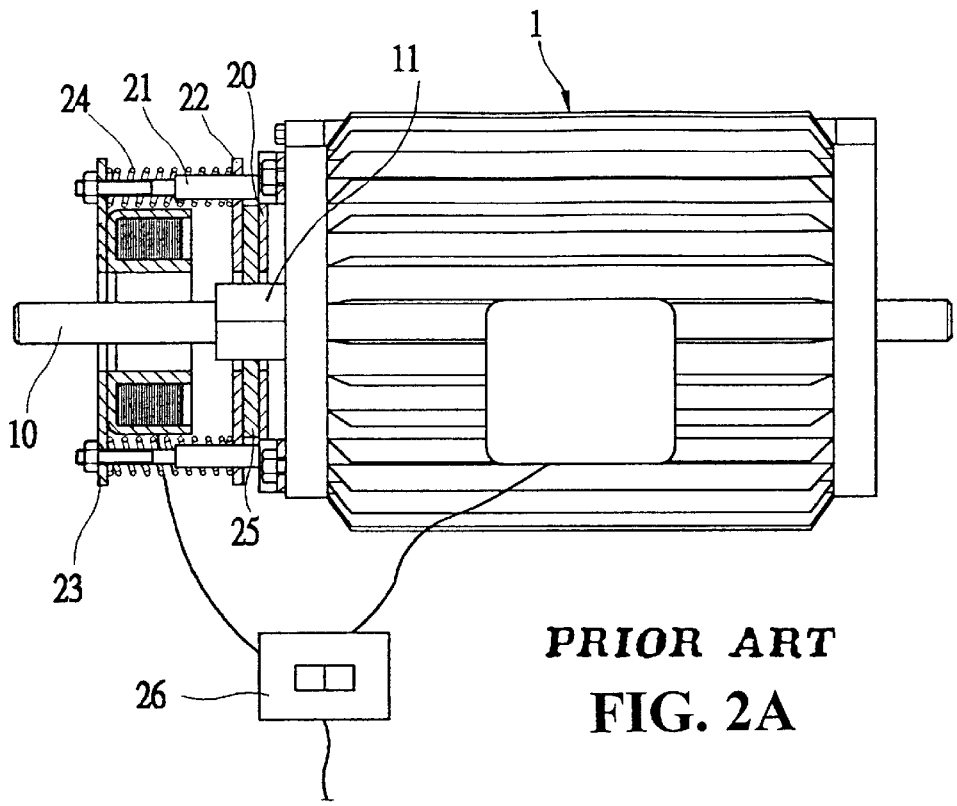
FIGS. 2A and 2B are schematic views showing a conventional motor brake structure when current is supplied thereto and when current is cut off.
Figure 2B:
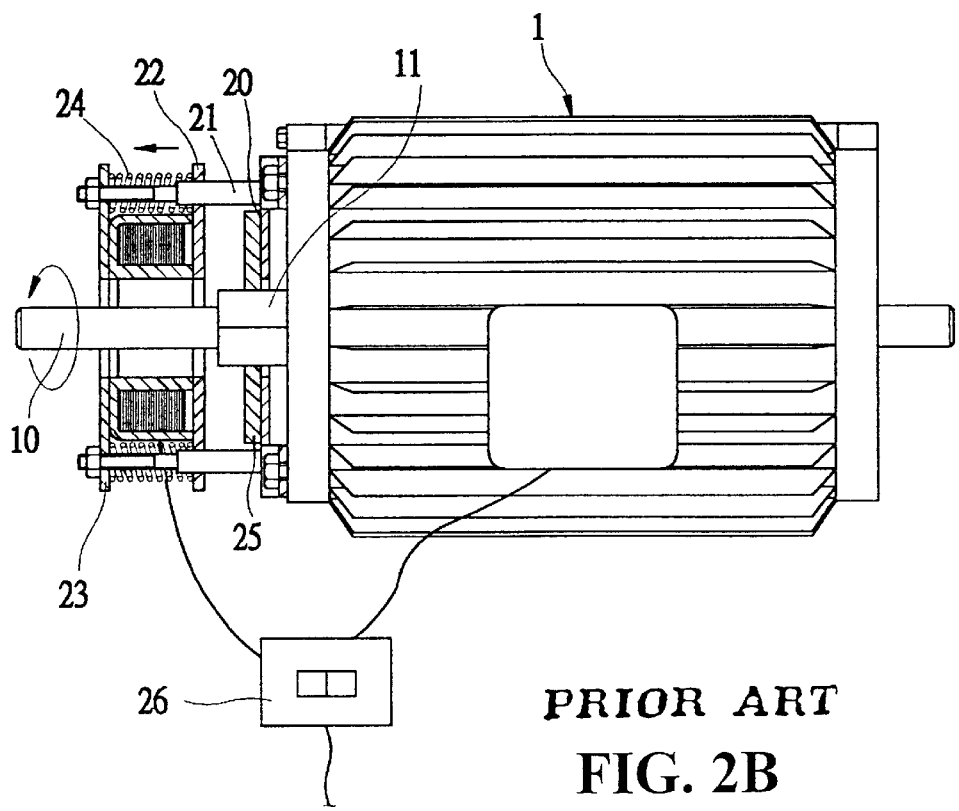
Figure 3:
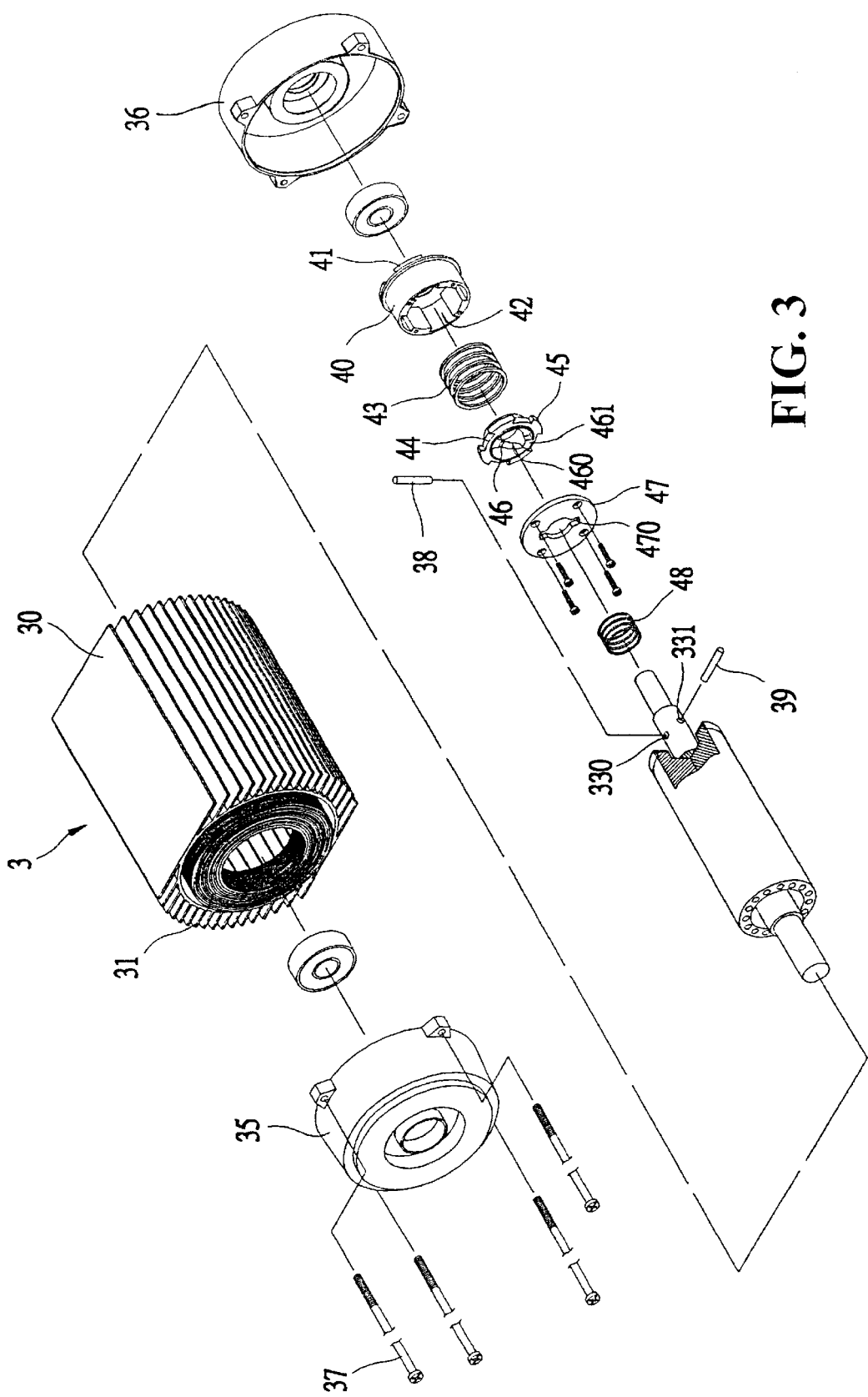
FIG. 3 is a perspective exploded view of the motor brake structure, illustrating the components of the structure and their relationship in accordance with the present invention.

The present invention relates to a motor-synchronous exciting brake structure, which can shorten braking time. As shown in FIG. 3, the motor 3 has a housing 30 mounted with a stator 31 therein. The center of the stator 31 is provided with a rotor 32 having a rotating shaft 33 mounted thereto. The two ends of the housing 30 are respectively mounted with an end caps 35, 36 by bolts 37. After the motor 3 has been excited, the rotor 32 and the stator 31 produce same phase magnetism and rotate. A brake structure 4 is provided on the rotor shaft 33. When the current supply to the motor 3 is cut off, the brake structure provide a braking effect to stop the rotor 32.

Figure 4:
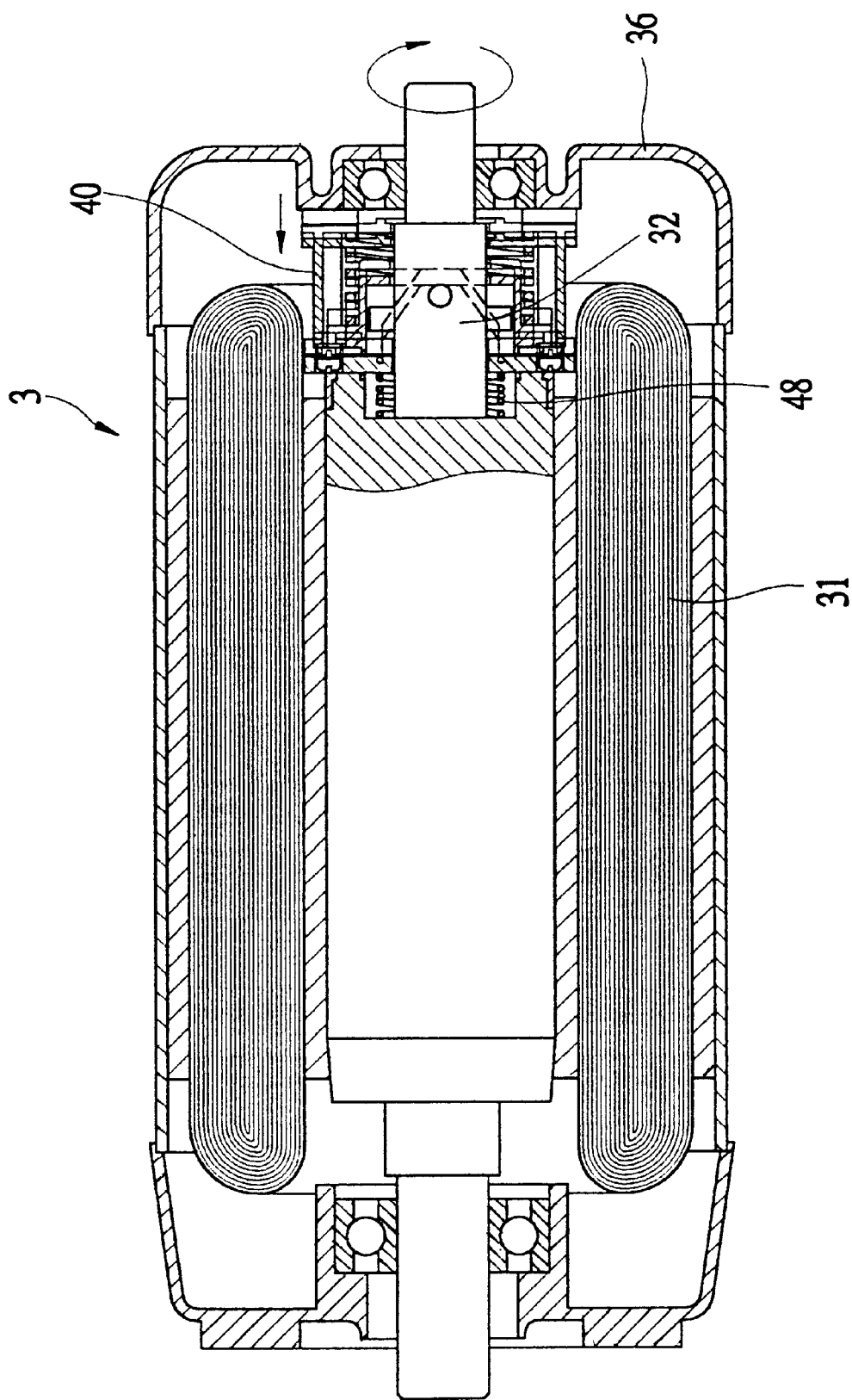
FIG. 4 is a schematic view showing the motor brake structure of the present invention when current is supplied thereto.
Figure 5:
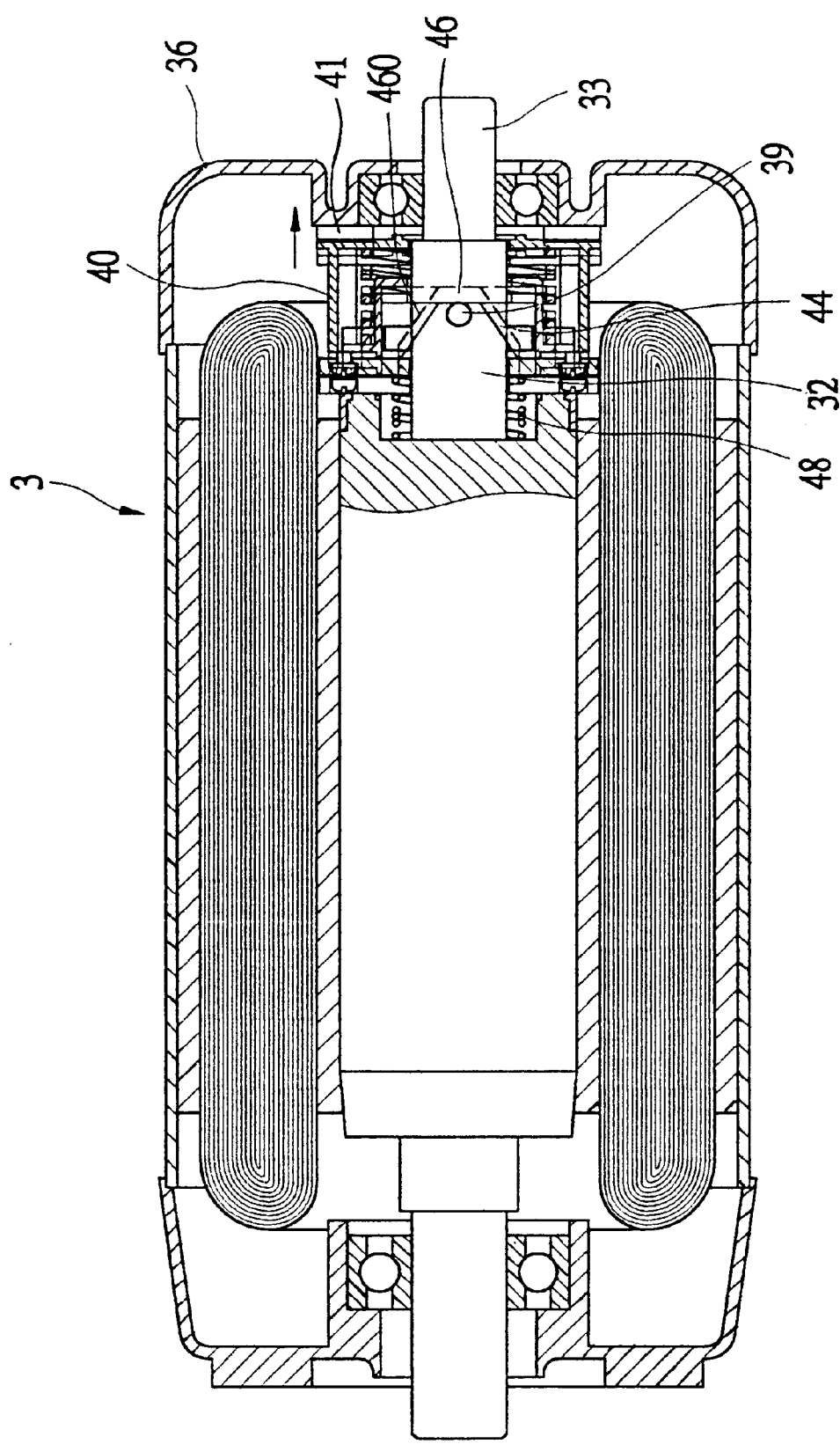
FIG. 5 is a schematic view showing the motor brake structure of the present invention at the first initial time when current is cut off.

Referring to FIGS. 3, 4 and 5, the brake structure 4 is provided with a floating element 40 slidably located at the rotor shaft 33 and the end face of the floating element 40, corresponding to the end cap 36, is provided with a plurality of brake blocks 41 for braking purpose. A triggering element 44 is slidably mounted within the floating element 40, and the inner edge of the floating element 40 is provided with a plurality of axial sliding slots 42 for the slidably mounting of the triggering element 44 having a corresponding sliding plate 45. An elastic element 43 is urged by the triggering element 44 and the floating element 40, and further, the end face of the triggering element 44, corresponding to the rotor 32, is formed with two corresponding guiding slots 46, and one side of the guiding slot 46 is provided with a sloping face 460. The sloping face 460 is inclined toward the end face. A stopping block 461 is formed at the end face of the sloping face 460 of the guiding slot 46. The other end face of the floating element 40 is a limiting plate 47 to restrict the triggering element 44 and the elastic element 43, the circumference of the center hole of the limiting plate 47 is provided with two corresponding extension slots 470, and a triggering spring 48 is located between the rotor 32 and the limiting plate 47.

In accordance with the present invention, the rotor shaft 33 of the rotor 32 is formed with the two insertion holes, 330, 331 located at an interval. The insertion hole 330, near to the rotor 32, is inserted by a limiting rod 38 for the position of the brake structure 4. The insertion hole 331, near to the free end, is provided with a guiding rod 39. The guiding rod 39 is appropriately and correspondingly mounted at the guiding slot 44 of the triggering element 46, as shown in FIG. 5.

In view of the above structure, the elastic element 43 is located within the floating element 40 and the sliding plate 45 of the triggering element 44 is slidably mounted within the sliding slot 42 of the floating element 40, and the limiting plate 47 is locked at the end face of the floating element 40. Next, the extension slots 470 at the circumference of the center hole of the limiting plate 47 are inserted in sequence by the guiding rod 39 and the limiting rod 38 of the rotor shaft 33. At the same time, the guiding rod 39 is engaged at the guiding slot 46 of the triggering element 44, and the limiting rod is engaged at the inner edge of the limiting plate 47. This will cause the brake structure 4 to position at the rotor shaft 33 of the rotor 32 and form into a motor-synchronous exciting brake structure.

In view of operation of the present invention, when the motor 3 is switched on and excited, as shown in FIG. 4, after the motor 3 has been excited, the rotor 32 and the stator 31 synchronously produce same phase magnetism. At the same time, the rotor 32 produces magnetism with respect to the brake structure 4, such that the entire brake structure 4 compresses the triggering spring 48 and biases to the rotor 32. Thus, the brake block 41 of the floating element 40 is dislocated from the internal of the end cap 36 of the motor 3, and the rotor 32 will not be restricted but free to rotate.

Figure 6:
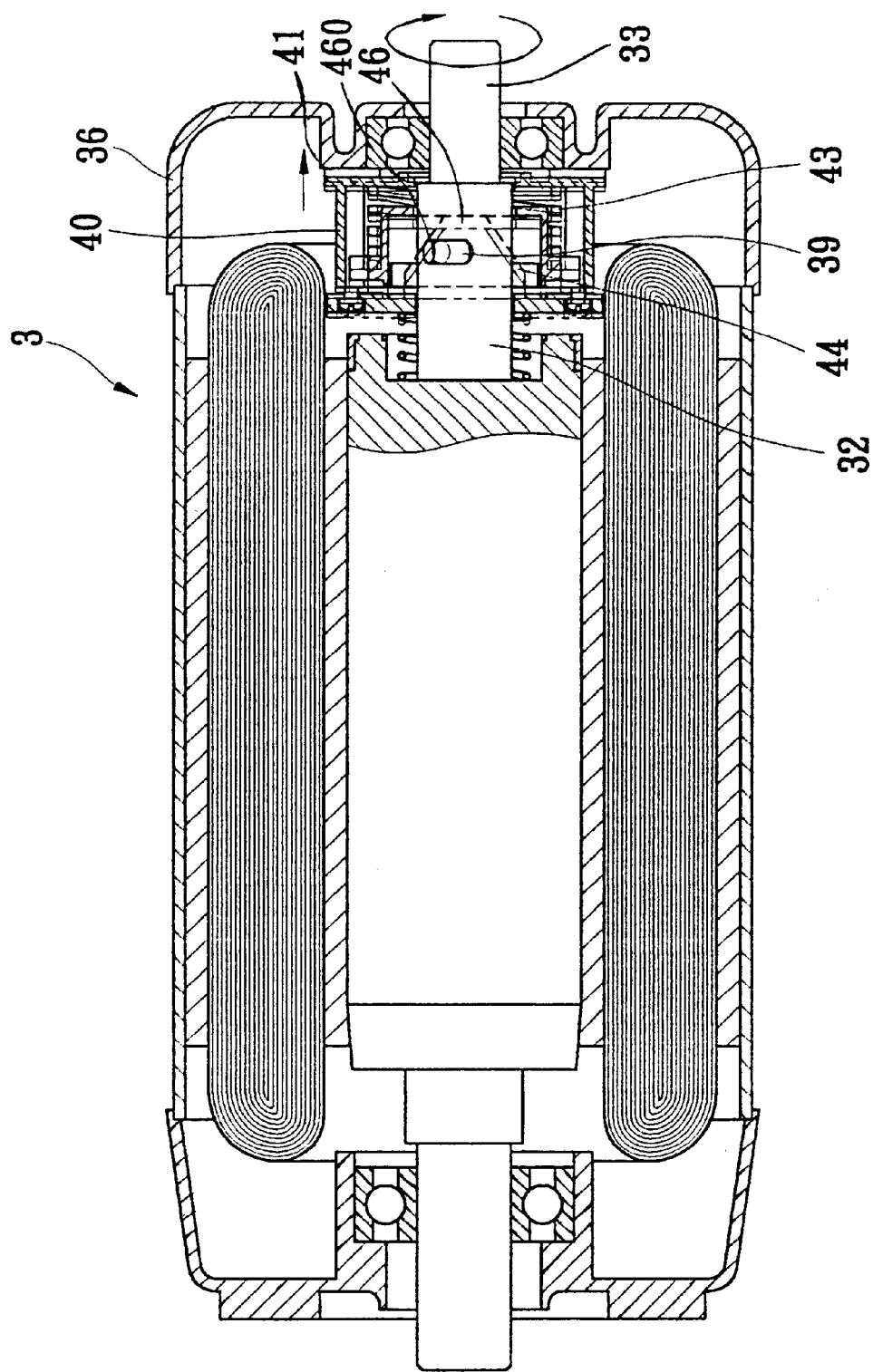
FIG. 6 is a schematic view showing the action of the over-ride brake of the motor of the present invention.

On the other hand, if the current supply to the motor 3 is cut off, as shown in FIGS. 5 and 6, at the moment of currency cut-off while braking, the rotor 32 loses its magnetism and the brake structure 4 is acted by the spring 48 and is pushed toward the end cap 36 of the motor 3, such that the brake block 41 of the floating element 40 biases to the inner face of the end cap 36. At this moment, as a result of the inertia of the rotor 32, the guiding rod 39 of the rotor shaft 33 will rotate continuously and moves along the sloping face 460 of the guiding slot 46. As the sloping face 46 is at an inclined position, the guiding rod 39 will not move horizontally, the triggering element 44, caused by the sliding plate 45, moves along the sliding slot 42 toward the end cap 36 (as shown in FIG. 6), and in sequence, it urges the elastic element 43 and the floating element 40 such that the force which urges the end cap 36 by the brake block 41 increases, and at the same time, the guiding rod 39 is blocked by the stopping block 461, and cannot be rotated and causes the rotor 32 to stop simultaneously. Thus, the braking time is shortened.

The advantages of the present invention are as follows:
(I) Mitigate Erroneous Action.
    As the present invention employs the motor exciting to achieve the effect of braking without providing additional magnetic coil, the erroneous action caused by conventional motor is avoided.
(ii) The stability of braking is improved.
    As the brake structure 4 employs a triggering spring 48 and an elastic element 43 to exert a force at different stage, no bias will be formed in the braking action.
(iii) Braking time is shortened.
    The present invention provides a greater braking force and the braking time is thus shortened.
(iv) Buffering effect of braking is excellent.
    If the frictional force of braking is too great, the end cap 36 will produce a reaction force to the brake block 41. Thus, the floating element 40 makes use of the compression of the spring to produce a buffering effect.
(v) The braking force can be automatically adjusted.
    If the braking block 41 is worn out, the guiding rod 39 will increase its displacement which causes a larger displacement of the triggering element 44 to achieve the adjustment of braking force.

While the invention has been described with respect to a preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A brake structure having a housing containing a stator and a rotor located at a center of the stator, two ends of the housing respectively mounted with an end cap, and a rotor shaft of the rotor mounted with a brake structure used to brake the rotor; wherein the brake structure is provided with a floating element slidably located on the rotor shaft and an end face of the floating element is provided with a plurality of brake blocks for braking the rotor, a triggering element is slidably mounted within the floating element, and an elastic element is forced by the triggering element and the floating element; wherein an end face of the triggering element is formed with two corresponding guiding slots with one side of the guiding slot provided with a sloping face inclined toward the end face of the floating element; wherein the other end face of the floating element is a limiting plate to restrict the triggering element, a circumference of a center hole on the limiting plate is provided with two corresponding extension slots, and a triggering spring is located between the rotor and the limiting plate; wherein the rotor shaft is provided with a limiting rod and a guiding rod, the limiting rod is engaged at an inner edge of the limiting plate, and the guiding rod is correspondingly mounted at a guiding slot of the triggering element; wherein an inner edge of the floating element is provided with a plurality of axial sliding slots and the triggering element is provided with a corresponding sliding plate such that the triggering element slides within the floating element; and wherein the guiding slot of the triggering element is formed with a stopping block at a sloping end face for rapid positioning of the guiding rod and the rotor shaft is provided with two insertion holes for insertion of the limiting rod and the guiding rod.

* * * * *